United States Patent [19]

Leon-Guerrero

[11] Patent Number: 5,191,207

[45] Date of Patent: Mar. 2, 1993

[54] OPTICAL DETECTOR APPARATUS WITH RIGID POSITIONING FIXTURE

[76] Inventor: Harry C. Leon-Guerrero, 349 West 232nd Pl., Carson, Calif. 90745

[21] Appl. No.: 751,131

[22] Filed: Aug. 28, 1991

[51] Int. Cl.[5] ............................ H01J 5/16; H01J 40/14
[52] U.S. Cl. ................................ 250/227.11; 356/73.1
[58] Field of Search ........................... 250/227.11, 239; 356/73.1; 359/143

[56] References Cited

U.S. PATENT DOCUMENTS

| | | | |
|---|---|---|---|
| 4,600,303 | 7/1986 | Mogensen | 356/73.1 |
| 4,671,653 | 6/1987 | So et al. | 356/73.1 |
| 4,741,616 | 5/1988 | So et al. | 356/73.1 |
| 4,838,689 | 6/1989 | Neumann | 356/73.1 |
| 4,981,333 | 1/1991 | Hayes | 356/73.1 |

Primary Examiner—David C. Nelms
Assistant Examiner—S. Allen
Attorney, Agent, or Firm—Leon Gilden

[57] ABSTRACT

An instrument arranged for detecting light directed into an optical fiber includes a housing, with a flexible fiber optic filament directed therefrom. The housing includes a light sensitive switch in cooperation with an optical detector to effect indication of an indicator illumination member, such as LED light. The invention further includes a positioning fixture to receive a forward end portion of the fiber optic cable or filament defined by a rigid tube, with a torroidal positioning wheel mounted about the tube, wherein the positioning wheel includes a plurality of elastomeric spokes preventing damage to the fiber optic cable during use.

4 Claims, 4 Drawing Sheets

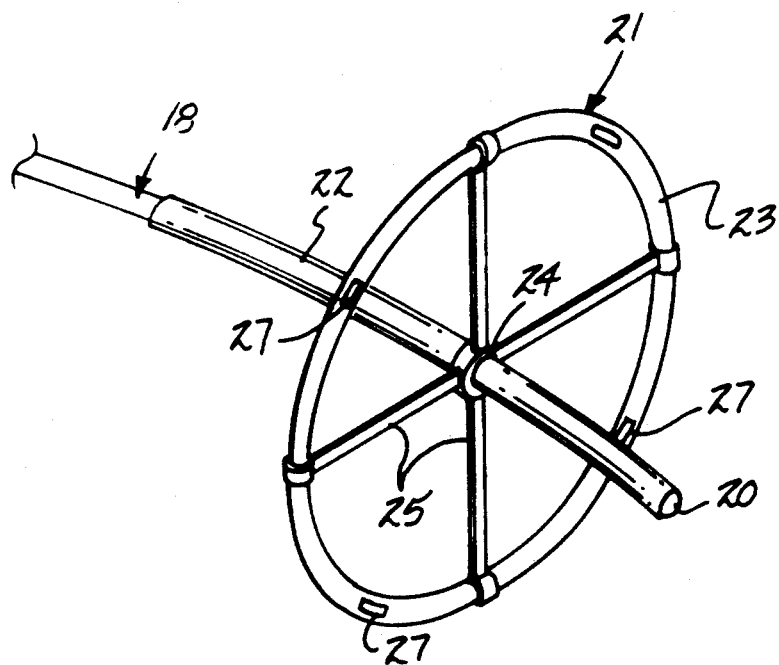
FIG 3
FIG 4
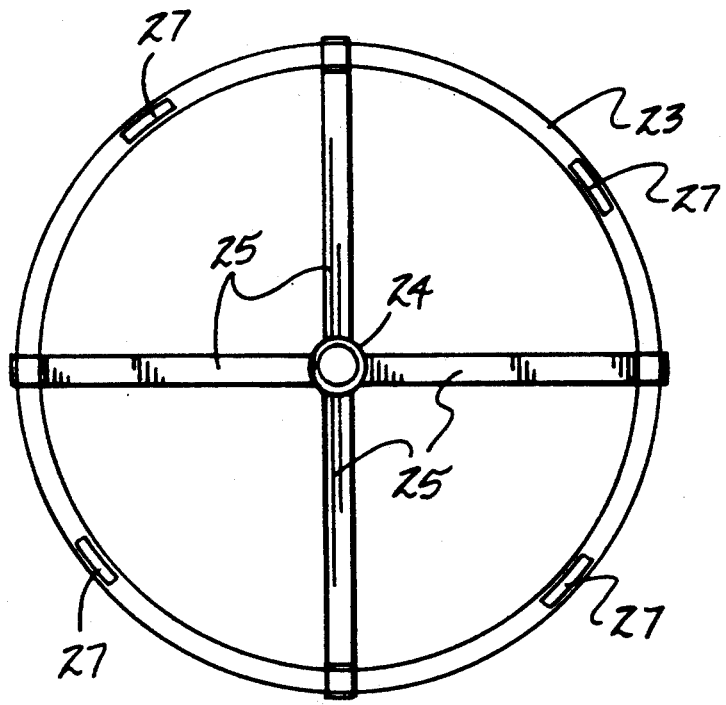

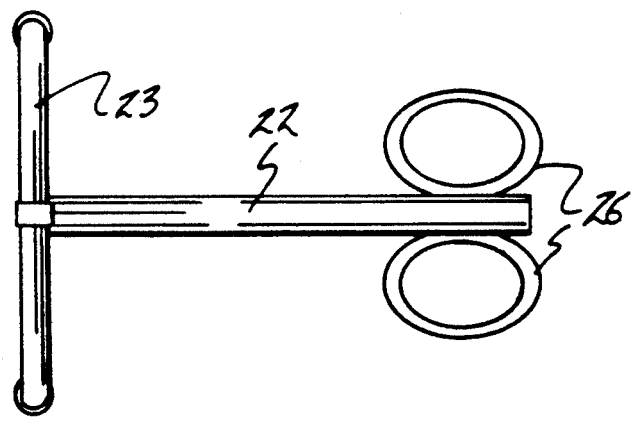
Fig 5
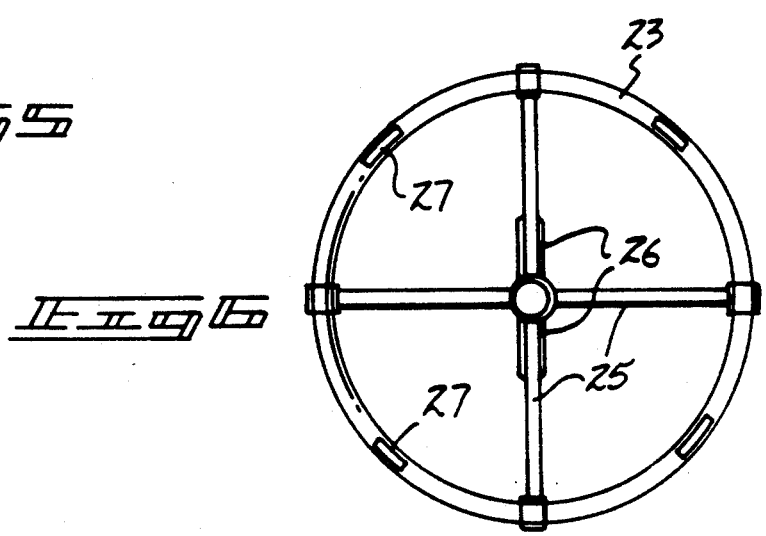
Fig 6
Fig 7
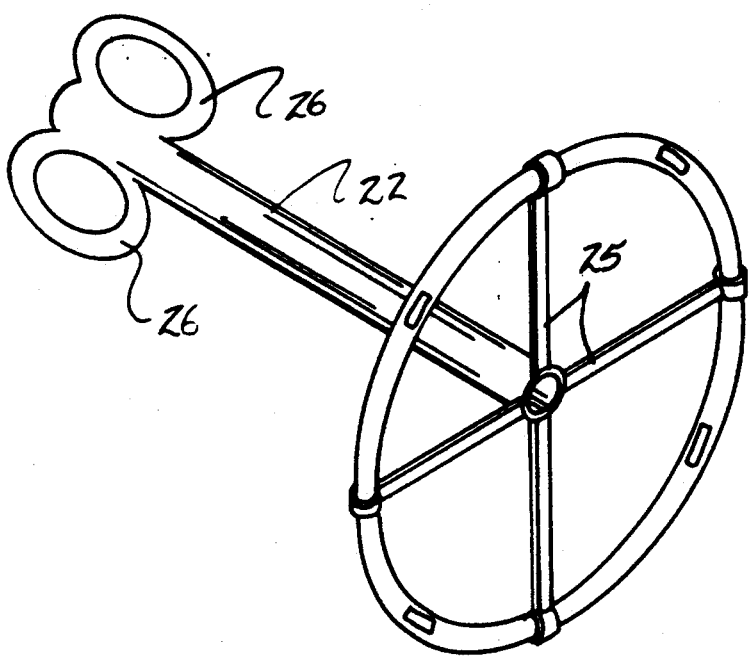

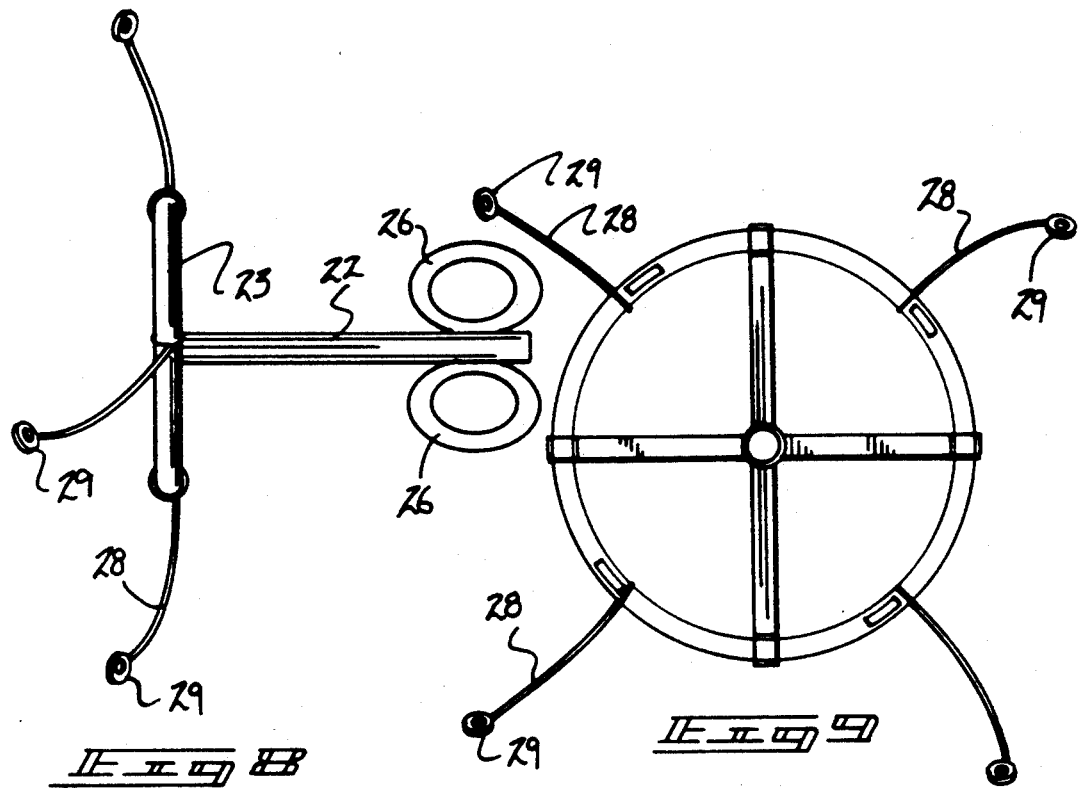
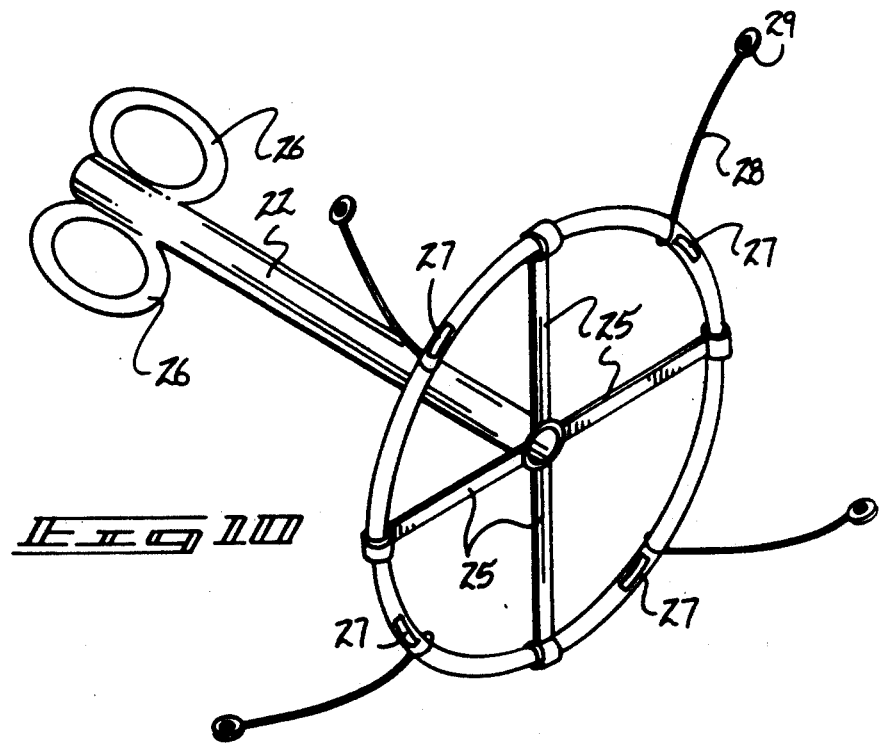

OPTICAL DETECTOR APPARATUS WITH RIGID POSITIONING FIXTURE

BACKGROUND OF THE INVENTION

1. Field of the Invention

The field of invention relates to test equipment, and more particularly pertains to a new and improved optical detector apparatus wherein the same is arranged to detect illumination directed into a fiber optic cable.

2. Description of the Prior Art

Various fiber optic cable apparatus is utilized in the prior art for repair in telecommunication and the like, wherein such apparatus is exemplified in U.S. Pat. No. 4,671,653 to So, et al. utilizing a portable battery powered test instrument formed with a unitary housing, including a fiber optic member within the housing.

U.S. Pat. No. 4,741,616 to So, et al. sets forth a further example of a test instrument utilizing a fiber optic cable, wherein light enters an optical fiber by way of a connector under test conditions.

U.S. Pat. No. 4,899,045 to Kramer sets forth a continuity test system utilizing a plurality of fiber cables, each cable having a proximate end, with a reflector mounted at each distal end of each cable, wherein selection of wood fibers to be tested is a matter of manipulating a rotator element which orients the test cable in an appropriate position.

As such, it may be appreciated that there continues to be a need for a new and improved optical detector apparatus as set forth by the instant invention which addresses both the problems of ease of use as well as effectiveness in construction in presenting a flexible fiber optic cable relative to a test forum such as in the checking of TV remote controllers, video cassette recorders and the like and in this respect, the present invention substantially fulfills this need.

SUMMARY OF THE INVENTION

In view of the foregoing disadvantages inherent in the known types of optical detector apparatus now present in the prior art, the present invention provides an optical detector apparatus wherein the same utilizes a flexible remote fiber optic cable for positioning relative to a ray of light along a particular wave length, such as infrared such as utilized in various remote control equipment. As such, the general purpose of the present invention, which will be described subsequently in greater detail, is to provide a new and improved optical detector apparatus which has all the advantages of the prior art optical detector apparatus and none of the disadvantages.

To attain this, the present invention provides an instrument arranged for detecting light directed into an optical fiber including a housing, with a flexible fiber optic filament directed therefrom. The housing includes a light sensitive switch in cooperation with an optical detector to effect indication of an indicator illumination member, such as LED light. The invention further includes a positioning fixture to receive a forward end portion of the fiber optic cable or filament defined by a rigid tube, with a torroidal positioning wheel mounted about the tube, wherein the positioning wheel includes a plurality of elastomeric spokes preventing damage to the fiber optic cable during use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved optical detector apparatus which has all the advantages of the prior art optical detector apparatus and none of the disadvantages.

It is another object of the present invention to provide a new and improved optical detector apparatus which may be easily and efficiently manufactured and marketed.

It is a further object of the present invention to provide a new and improved optical detector apparatus which is of a durable and reliable construction.

An even further object of the present invention is to provide a new and improved optical detector apparatus which is susceptible of a low cost of manufacture with regard to both materials and labor, and which accordingly is then susceptible of low prices of sale to the consuming public, thereby making such optical detector apparatus economically available to the buying public.

Still yet another object of the present invention is to provide a new and improved optical detector apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the positioning fixture utilized by the invention.

FIG. 4 is an orthographic end view, taken in elevation, of the positioning fixture utilized by the invention.

FIG. 5 is an orthographic side view of a modified positioning fixture utilized by the invention.

FIG. 6 is an orthographic front view, taken in elevation, of the positioning fixture as set forth in FIG. 5.

FIG. 7 is an isometric illustration of the positioning fixture as set forth in FIG. 5.

FIG. 8 is an orthographic side view of a further positioning fixture construction utilized by the invention.

FIG. 9 is an orthographic end view, taken in elevation, of the positioning fixture as set forth in FIG. 8.

FIG. 10 is an isometric illustration of the positioning fixture as set forth in FIG. 8.

DESCRIPTION OF THE PREFERRED EMBODIMENT

Figure 1:
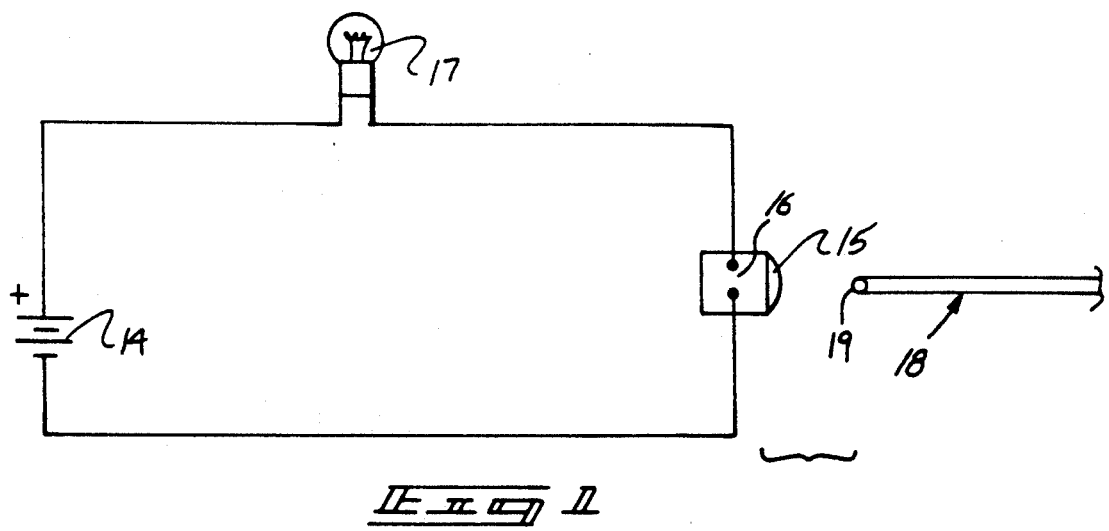
FIG. 1 is a diagrammatic illustration of a detector lens and its cooperation with an indicator lens for use by the invention.
Figure 2:
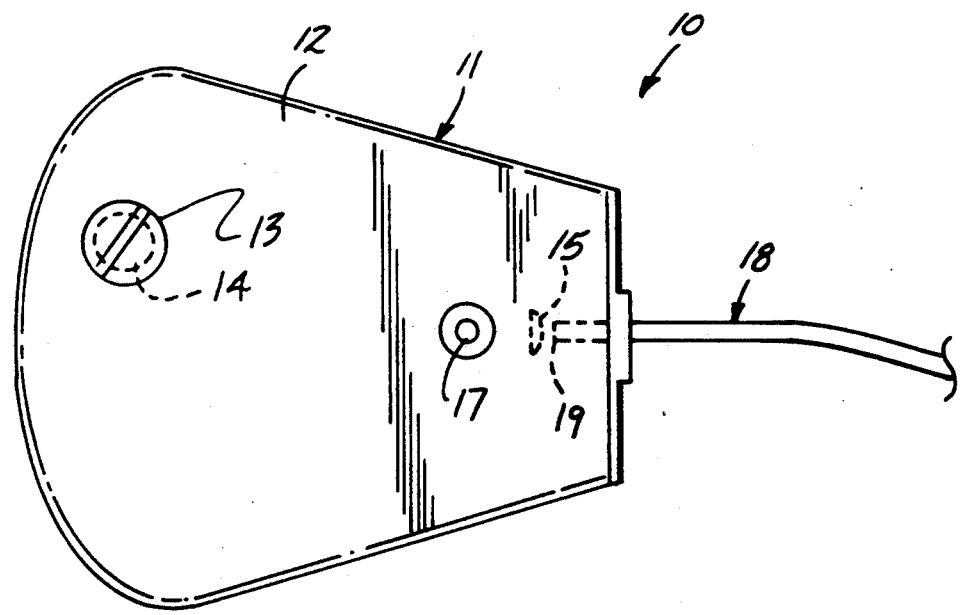
FIG. 2 is an orthographic top view of the housing utilized by the invention.

With reference now to the drawings, and in particular to FIGS. 1 to 10 thereof, a new and improved optical detector apparatus embodying the principles and concepts of the present invention and generally designated by the reference numeral 10 will be described.

More specifically, the optical detector apparatus 10 of the instant invention essentially comprises a housing 11 formed with a top wall 12 to include a removable battery cover 13 for maintenance for removal and replacement of a battery 14 positioned thereunder. An optical detector lens 15 cooperates with a light sensitive switch 16 to effect illumination of an indicator illumination member 17 directed through the housing top wall 12. The illumination member 17 may include a light emitting diode (LED) for such indication. Appropriate circuitry for indication of predetermined wave lengths, such as infrared, is available in the prior art and is exemplified for example in U.S. Pat. No. 4,671,653, incorporated herein by reference.

A flexible fiber optic cable 18 is directed through the housing 11 positioned in adjacency to the optical detector lens 15 at the rear end portion 19 of the fiber optic cable 18. A forward end portion 20 of the flexible fiber optic projects forwardly thereof for orientation relative to a device to be tested for availability of a predetermined wave length of light for projection into the fiber optic cable 18 through the forward end 20.

A positioning fixture 21 is provided for use by the organization, wherein the fixture includes a rigid tube 22 orthogonally oriented at its forward terminal end positioned coaxially of a torroidal rigid positioning wheel 23. The rigid tube 22 is positioned coaxially of the positioning wheel 23 by elastomeric spokes 25 coaxially positioning the tube at the tube forward end 24. The elastomeric spokes 25 accommodate impact of the fiber optic cable that is directed complementarily through the rigid tube 22, in a manner as illustrated in FIG. 3 for example. In use, the rear portion of the tube 22 may include finger grasping loops 26 formed of a rigid material to permit accommodation of an individual's fingers therewithin for assistance in orienting in a secure manner the fixture relative to a device to be tested. Further, ferromagnet members 27 are positioned within the torroidal positioning wheel 23 at equally spaced intervals through a forward face thereof in a generally coplanar relationship relative to the tube forward end 24 for assistance in positioning the fixture 21 as required. Further, flexible securement tether lines 28 are provided, with each tether line including a loop 29 formed at a distal forward end of each tether line 28 to further provide means for mounting the fixture relative to a structure to be tested.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An optical detector apparatus, comprising, a housing, the housing including a top wall, with the top wall including a battery cover removably mounted through the top wall, with a battery positioned within the housing, and the housing including an optical detector lens positioned within the housing, and the optical detector lens in electrical communication with a light sensitive switch, the light sensitive switch in electrical communication with an indicator illumination member directed through a top wall of the housing to effect illumination of the illumination member upon detection of a predetermined light wave length by the optical detector lens, and a flexible fiber optic cable directed through the housing adjacent the optical detector lens, with a rear end portion of the flexible fiber optic cable directed in adjacency to the optical detector lens, and a forward end portion of the fiber optic cable oriented in a remote position relative to the housing, and a positioning fixture slidably receiving the forward end portion of the fiber optic cable, and the positioning fixture includes a rigid tube, the rigid tube complementarily receiving the forward end portion of the fiber optic cable therethrough, and the rigid end tube including a tube forward end, the tube forward end mounted coaxially relative to a torroidal rigid positioning wheel, the rigid tube coaxially aligned with the torroidal rigid positioning wheel, and the tube forward end including a plurality of equally spaced elastomeric spokes mounting the tube forward end coaxially of the rigid tube.

2. An apparatus as set forth in claim 1 wherein the rigid tube includes a rigid tube rear end portion, the rigid tube rear end portion includes a plurality of rigid finger grasping loops for receiving an individual's finger for assistance in manipulating the positioning fixture.

3. An apparatus as set forth in claim 2 wherein the torroidal rigid positioning wheel includes a plurality of ferromagnet members arranged in a coplanar relationship relative to one another and the tube forward end, wherein the ferromagnet members are arranged for magnetic securement to a device to be tested.

4. An apparatus as set forth in claim 3 wherein the torroidal positioning wheel further includes a plurality of equally spaced flexible securement tether lines mounted to the torroidal positioning wheel, and each tether line includes a flexible loop mounted at a distal end of each tether line to permit securement of the loop to the device to be tested.

* * * * *